United States Patent
Lee et al.

(10) Patent No.: US 7,663,341 B2
(45) Date of Patent: Feb. 16, 2010

(54) SYSTEM FOR CONTROLLING VOLTAGE BALANCING IN A PLURALITY OF LITHIUM-ION CELL BATTERY PACKS AND METHOD THEREOF

(75) Inventors: Dal-Hoon Lee, Seoul (KR); Han-ho Lee, Daejeon (KR); Jee-ho Kim, Daejeon (KR); Eguchi Yasuhito, Ebina (JP)

(73) Assignee: LG Chem, Ltd., Seoul (KR)

( * ) Notice: Subject to any disclaimer, the term of this patent is extended or adjusted under 35 U.S.C. 154(b) by 203 days.

(21) Appl. No.: 11/722,776

(22) PCT Filed: Dec. 22, 2005

(86) PCT No.: PCT/KR2005/004451

§ 371 (c)(1),
(2), (4) Date: Nov. 1, 2007

(87) PCT Pub. No.: WO2006/068429

PCT Pub. Date: Jun. 29, 2006

(65) Prior Publication Data

US 2008/0129247 A1    Jun. 5, 2008

(30) Foreign Application Priority Data

Dec. 24, 2004 (KR) ............... 10-2004-0112021

(51) Int. Cl.
*H02J 7/00* (2006.01)
(52) U.S. Cl. .................... 320/119; 320/118
(58) Field of Classification Search ........... 320/116, 320/118–119
See application file for complete search history.

(56) References Cited

U.S. PATENT DOCUMENTS

| | | | |
|---|---|---|---|
| 5,710,504 A * | 1/1998 | Pascual et al. | 180/65.8 |
| 5,998,967 A | 12/1999 | Umeki et al. | |
| 6,417,648 B2 * | 7/2002 | Suzuki et al. | 320/136 |
| 7,378,818 B2 * | 5/2008 | Fowler et al. | 320/119 |
| 2005/0242775 A1 * | 11/2005 | Miyazaki et al. | 320/116 |

FOREIGN PATENT DOCUMENTS

| | | |
|---|---|---|
| JP | 10-32936 A | 2/1998 |
| JP | 11-150880 A | 6/1999 |
| JP | 2000182677 | 6/2000 |
| JP | 2002-374633 A | 12/2002 |
| JP | 2004301782 | 10/2004 |

OTHER PUBLICATIONS

International Search Report; PCT/KR2005/004451; Apr. 7, 2006 All the references cited in the Serach Report are listed above.

* cited by examiner

*Primary Examiner*—Edward Tso
*Assistant Examiner*—Samuel Berhanu
(74) *Attorney, Agent, or Firm*—Birch, Stewart, Kolasch & Birch, LLP.

(57) ABSTRACT

Disclosed are system and method for adjusting a voltage balancing of cell in a lithium ion multicell battery pack, the system comprising; a multicell battery pack including a master module and a slave module, a CPU located in the system controller and outputting a synchronization signal for each of the cells in the master module and the slave module, a first vertical interface transmitting the synchronization signal outputted from the CPU to the master module, and a second vertical interface transmitting the synchronization signal to the slave module through the first vertical interface.

18 Claims, 4 Drawing Sheets

[Fig. 1]
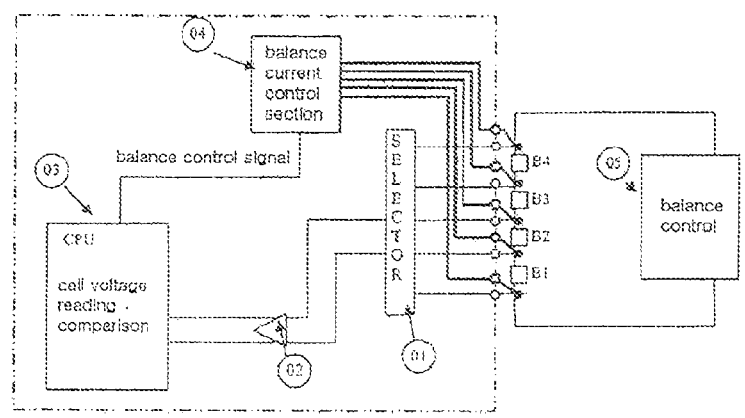
RELATED ART
[Fig. 2]
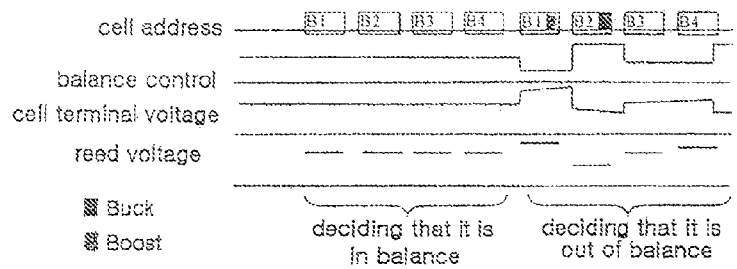
RELATED ART

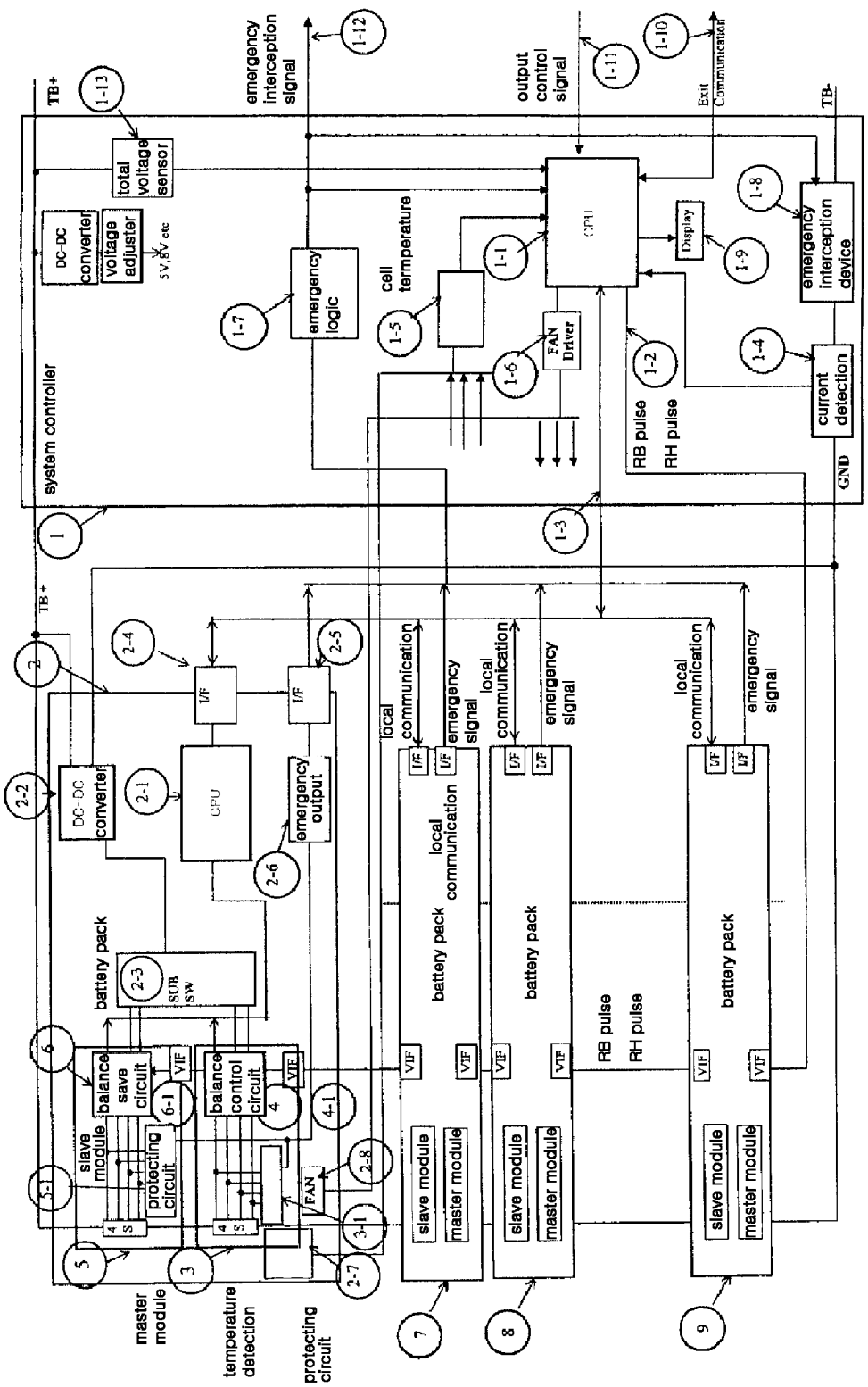
[Fig. 3]

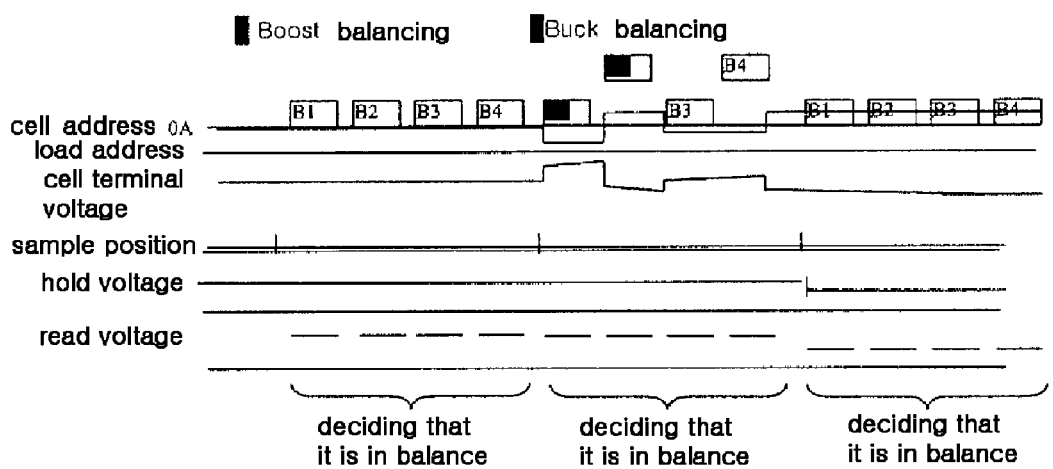
[Fig. 4]

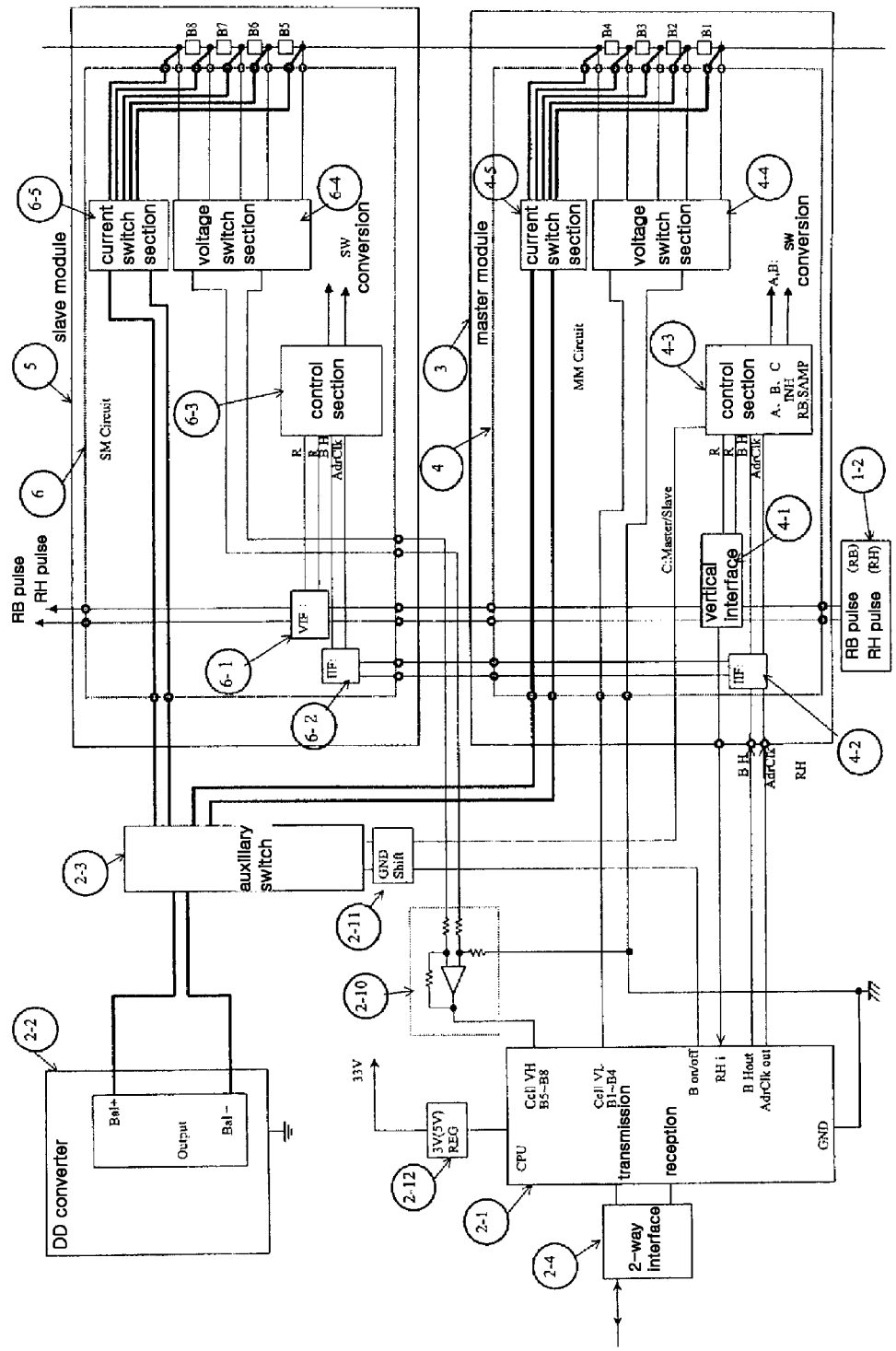
[Fig. 5]

SYSTEM FOR CONTROLLING VOLTAGE BALANCING IN A PLURALITY OF LITHIUM-ION CELL BATTERY PACKS AND METHOD THEREOF

TECHNICAL FIELD

The invention relates to a battery balancing system reading voltages of cells in a multicell battery pack and comparing the read voltages to charge or discharge the cells, and more particularly to a battery balancing system and method for reading voltages of all cells in a battery pack with a same timing so as to eliminate a cell voltage reading error due to a voltage reading time difference.

BACKGROUND ART

In general, a battery power supply unit is an electric power source supplying an energy to a related electronic device and a multicell battery pack is applied as the supply unit. By using the multicell pack, rather than a single cell, it is possible to apply a high voltage or to increase a capacity. However, since the cell itself has charge/discharge characteristics, a voltage of each cell tends to be unbalanced as time goes by.

The voltage difference between the cells in the battery pack may generate an un-balancing between the battery cells, thereby causing a capacity loss of the battery pack. With regard to this, it has been developed various battery balancing systems and methods for balancing each cell so as to prevent overcharges of all battery cells and to uniformly charge the cells.

For example, there is a method of allowing a current to flow to a high voltage cell of cells in a battery pack through a resistance and the like so as to adjust a cell balancing. Although this method is simple, it has a disadvantage that a discharge current is increased and heat is much generated if the number of unbalanced high voltage cells is increased. In addition, the method has also a disadvantage that the balance is adjusted to a cell having the lowest voltage of the cells in the battery pack.

In addition, there is a method of allowing a charge current to flow to a low voltage cell of cells in a battery pack so as to adjust a balancing. This method uses a DC-DC converter and has advantages that efficiency is generally high and heat is less generated.

However, the method has also a disadvantage that a cell voltage of the entire battery pack becomes lower than its original lowest voltage if the number of low voltage cells is increased.

Further, there is a considerable difference between read voltages due to a reading timing difference when a voltage of each cell is read. Due to the voltage reading timing difference, the battery balancing system decides that the cells are unbalanced.

It will be described a difference of voltage values according to the voltage reading time of each cell, with reference to FIGS. 1 and 2.

FIG. 1 is a schematic view showing an apparatus for adjusting a voltage balancing using a line selecting device in a lithium ion cell battery according to the prior art and FIG. 2 is a view illustrating a voltage reading timing in a lithium ion cell battery according to the prior art.

Referring to FIG. 1, in the prior voltage balancing adjusting apparatus, when load current flows through a load device 5, terminal voltage of cells are sensitively changed as the load current is varied. The load of the load device 5 is varied as time goes by. Accordingly, when the voltages of the cell terminals are read and compared in a CPU 3 through a line selecting device 1, the voltage value of each cell terminal is differently read even though the voltages of all cells are substantially balanced. As a result, the CPU 3 decides that each of the cells is unbalanced, and thus outputs a balance control signal to control a balance current control section 4.

Referring to FIG. 2, when the cell terminal voltages are read through the line voltage selecting device 1 in the battery balancing system, it can be seen that the cell terminal voltages are not varied if the load current is not changed in the cells (B1, B2, B3, B4). Accordingly, the CPU 3 decides that the voltage of the cell terminal is balanced. However, the terminal voltages of the cells are varied when the load current is changed. Accordingly, when the load current is changed in real-time, the CPU 3 decides that the voltages of the cell terminals are out of balance, due to the voltage reading difference resulting from the load variance as time goes by.

Like this, when the CPU 3 reads the terminal voltages of the cells using the line selecting device 1, the read voltage values of the cells may be different due to the difference of times at which the terminals are selected.

Therefore, it is required a battery balancing system or method capable of eliminating a voltage reading error of cells in a cell system, rapidly performing a voltage balancing and increasing an accuracy of a voltage balancing.

The battery balancing system according to the prior art has diverse condition limitations. For example, it performs a voltage balancing only when the system itself is not operated. Due to the limitations, the voltage balancing operation becomes complicated, an unnecessary time is consumed and an accuracy of the voltage balancing is decreased.

DISCLOSURE OF INVENTION

Technical Problem

Accordingly, the invention has been made to solve the problems occurring in the prior art. An object of the invention is to read a cell terminal voltage in a lithium ion cell battery after holding the voltage for a same retention time and thus to eliminate a reading error of the cell voltage resulting from a change of the terminal voltage as time goes by, thereby improving an accuracy of a cell balancing.

Another object of the invention is to receive voltage data of another battery pack via communication means in a battery balancing system consisting of a plurality of battery packs so as to adjust a voltage balance of a battery pack or to receive a target value of a voltage balance so as to adjust a voltage balance.

Technical Solution

In order to achieve the above objects, there is provided a cell balancing adjusting system adjusting a voltage balancing of cells in a lithium ion multicell battery pack and having a system controller, the system comprising: a multicell battery pack consisting of a master module and a slave module, a CPU located in the system controller and outputting a synchronization signal for each of cells in the master module and the slave module, a first vertical interface transmitting the synchronization signal outputted from the CPU to the master module and a second vertical interface transmitting the synchronization signal to the slave module via the first vertical interface.

According to an embodiment of the invention, the synchronization signal may comprise a signal for synchronizing the cells of the master module and a signal for synchronizing the master module and the slave module.

In addition, the synchronization signal may comprise a signal for synchronizing an interval of a plurality of multicell battery packs.

According to a preferred embodiment of the invention, the CPU may output a reading hold signal for holding instantaneous voltages of the cells in the multicell battery pack and a reading balance signal for performing reading and balancing of all cell voltages.

According to a preferred embodiment of the invention, the vertical interface may comprise a photo coupler transmitting the synchronization signal in parallel.

According to another aspect of the invention, there is provided a battery balancing system comprising a plurality of multicell battery packs including a first CPU reading terminal voltages of cells in a master module and a slave module, a system controller collecting, calculating and controlling cell related data from the multicell battery packs, a second CPU installed in the system controller and receiving data of all cells in the multicell battery packs to provide a balancing target value necessary for each of the battery packs, and a DC-DC converter controlling a direction of current flowing to each cell, based on the target value, to adjust a voltage balance.

According to a preferred embodiment of the invention, the second CPU may compare the balancing target value and the voltage of each cell and control a current direction of the DC-DC converter so that a balancing current flows to a charge direction in a cell when the voltage of the cell is lower than the balancing target value.

According to a preferred embodiment of the invention, the second CPU may compare the balancing target value and the voltage of each cell and control a current direction of the DC-DC converter so that a current flows to a discharge direction in a cell when the voltage of the cell is higher than the balancing target value.

According to a preferred embodiment of the invention, the data may comprise a maximum voltage, a minimum voltage and a mean value thereof.

According to a preferred embodiment of the invention, the second CPU may output a synchronization signal for synchronizing the multicell battery packs.

According to a preferred embodiment of the invention, the balancing system may further comprise a vertical interface provided between the multicell battery packs and transmitting the synchronization pulse.

Advantageous Effects

According to the invention, the terminal voltages of the cells are read with a same timing in the lithium ion cell battery, thereby improving an accuracy of the voltage balancing.

BRIEF DESCRIPTION OF THE DRAWINGS

The above and other objects, features and advantages of the present invention will be more apparent from the following detailed description taken in conjunction with the accompanying drawings, in which:

FIG. 1 is a schematic view showing an apparatus adjusting a voltage balancing using a line selecting device in a lithium ion cell battery according to the prior art;

FIG. 2 is a view showing a voltage reading timing of cells in a lithium ion cell battery according to the prior art;

FIG. 3 shows a voltage balancing system for cells in a multicell battery pack according to an embodiment of the invention; and FIG. 4 is a view showing a voltage reading timing of cells in a lithium ion cell battery according to an embodiment of the invention.

FIG 5. shows alternative embodiment of the invention.

BEST MODE FOR CARRYING OUT THE INVENTION

Hereinafter, preferred embodiments of the present invention will be described with reference to the accompanying drawings. In the following descriptions of the present invention, a detailed description of known functions and configurations incorporated herein will be omitted when it may make the subject matter of the present invention rather unclear.

FIG. 3 is a block diagram of a system performing a voltage balancing of cells of a plurality of multicell battery packs 2, 7, 8, 9 according to an embodiment of the invention.

The system comprises the plurality of multicell battery packs 2, 7, 8, 9 and a system controller 1.

The system controller 1 comprises a CPU 1-1, and collects and calculates diverse cell related data of each battery pack from the plurality of multicell battery packs 2, 7, 8, 9 and system inside sensors 1-4, 1-5, 1-13, thereby controlling the whole system. In addition, the controller 1 transmits data or a control signal to an apparatus using the plurality of multicell battery packs.

Output terminals of cells (4S+4S) of the multicell battery pack 2 are connected in series. A highest output terminal (TB+) and a lowest output terminal (TB−) of the multicell battery pack are used as a power output terminal of the system.

In addition, the output terminal (TB−) of the multicell battery pack passes through a current detecting device 1-4 and an emergency interception device 1-8. The current detecting device 1-4 is provided to detect current flowing in a cell and a resistance or Hall device is used as the current reading device.

The multicell battery pack 2 comprises a CPU 2-1, a DC-DC converter 2-2, an auxiliary switch 2-3, a master module 3 and a slave module 5.

The master module 3 and the slave module 5 have a substantially same structure.

The master module 3 comprises four cells 4S, a protecting circuit 3-1 and a balance control circuit 4. The slave module 5 comprises four cells 4S, a protecting circuit 5-1 and a balance control circuit 6. The balance control circuits 4, 6 have a function of converting a terminal voltage of each cell into a ground potential so that the CPU 2-1 can read the terminal voltage.

The balance control circuits 4, 6 of the master module 3 and the slave module 5 are respectively structured such that they can transmit/receive a signal through a vertical interface 6-1 (VIF). In addition, a vertical interface 4-1 in the balance control circuit 4 of the master module 3 can transmit/receive a signal with the multicell battery pack 7 below thereof. The signal comprises a signal for synchronizing the multicell battery pack 2 and a signal for synchronizing an interval of the multicell battery pack 2 and the multicell battery packs 7, 8, 9. These signals are transmitted/received between all the multicell battery packs 2, 7, 8, 9 through the vertical interfaces, thereby synchronizing all the battery packs.

Hereinafter, a cell balancing operation will be described with reference to the above structure.

In a battery balancing system according to an embodiment of the invention, the CPU 2-1 of the multicell battery pack 2 reads a terminal voltage of each cell in the master module 3 and the slave module 5. The read voltage data is transmitted to the CPU 1-1 of the system controller 1 via a local communication interface 2-4.

The balance control circuit 4 has an alternation switch so that a balance current can flow in each cell. The alternation switch can be controlled by the CPU 2-1.

The DC-DC converter 2-2 is inputted with outputs (TB+, TB−) of the multicell battery pack. In addition, the DC-DC converter 2-2 controls the auxiliary switch 2-3 and the balance control circuit 4 to enable the balance current to flow in each of the cells.

The CPU 1-1 of the system controller 1 receives data of a maximum voltage, a minimum voltage, a mean value thereof and the like of all cells in the battery pack and provides a balancing target value necessary for each battery pack.

Based on the balancing target value, each multicell battery pack controls the current and thus adjusts a balance thereof. In addition, the CPU 1-1 compares the balancing target value and a voltage of each cell and controls a current direction of the DC-DC converter so that a balancing current flows to a charge direction if the voltage of the cell is lower than the balancing target value. On the contrary, if the voltage of the cell is higher than the balancing target value, the CPU controls a current direction of the DC-DC converter so that a current flows to a discharge direction in the cell.

Like this, since the balancing target value is continuously renewed, a balancing of the whole system can be adjusted.

In addition, according to an embodiment of the invention, voltages of all the cells are preferably read at the same time. Accordingly, the CPU 1-1 outputs a synchronization pulse RB (reading & balance pulse) and a synchronization pulse RH (reading hold pulse).

Hereinafter, the synchronization pulses (RB, RH) outputted by the CPU 1-1 will be described with reference to FIG. 4.

FIG. 4 shows that the CPU 1-1 of the system controller 1 outputs the synchronization pulses to read terminal voltages of the cells with a same timing, according to an embodiment of the invention.

Referring to FIG. 4, when the CPU 1-1 outputs the reading hold pulse (RH), instantaneous voltages of the cells in all the multicell battery packs are held, so that all the cells can carry out the reading and the balancing of the cell voltage with a same timing by the reading balance pulse (RB).

Like this, the voltage balancing system of the invention transmits the synchronization pulses thereof to the vertical interface 6-1 of the slave module 5 via the vertical interface 4-1 of the master slave 3.

In addition, the synchronization pulses are sequentially transmitted to the vertical interface 6-1 of the multicell battery pack 2 through the vertical interface in the master module of the multicell battery pack 9. Thereby, the system having the plurality of multicell battery packs can also read the terminal voltages of all the cells in each of the battery packs with a same timing.

In the above embodiment, the two synchronization pulses (RB, RH) are used to synchronize the battery balancing system. However, the battery balancing system may be synchronized with one synchronization pulse only. In addition, although the synchronization signals are sequentially transmitted using the vertical interface, they may be transmitted in parallel using a photo coupler.

Hereinafter, a multicell battery pack will be specifically described with reference to FIG. 5.

Referring to FIG. 5, a cell alternation switch of the balance control circuit 4 of the master module 3 comprises a current switch 4-5 and a voltage switch 4-4.

Since the current switch 4-5 enables the balance current to flow, a switch device having a large current capacity is used. Since the voltage switch 4-4 reads the terminal voltage of the cell, its current capacity may not be large.

In addition, since the voltage switch 4-4 has a hold function, it can measure voltages with a same timing.

A control section 4-3 controls a cell address or performs a hold control. The cell address receives an address clock (AdrClk) pulse from the CPU 2-1 and selects one of the cells (B1, B2, B3, B4).

The address clock (AdrClk) pulse is converted into a signal level of the balance control circuit at a signal level of the CPU through an interface 4-2. The balance hold pulse (BH) is also converted into a signal level of the balance control circuit at a signal level of the CPU through the interface 4-2. The balance hold pulse is provided to read the cell voltage during the balance period. The reading hold pulse (RH) is inputted to synchronize all the multicell battery packs, from the exterior. However, the balance hold pulse (BH) is not synchronized with the other multicell battery packs and is outputted from the CPU 2-1 so as to perform the voltage reading with an individual timing.

When the reading balance pulse (RB) is inputted into the multicell battery pack, an operating state becomes under reading mode, the current switch is off and the cell (B1) is addressed. When the reading hold pulse (RH) is inputted into the battery pack, the cell voltage is held in a condenser. Then, when the address clock (AdrClk) is once inputted, the cell (B2) is addressed.

In addition, the voltage switch 4-4 is not directly connected to the cells (B1~B4) but connected to the condenser holding the voltages of the cells (B1~B4).

The current switch 4-5 is directly connected to the cells (B1, B2, . . . ). The current switch 4-5 is off at the reading balance mode. If the balance address is shifted to pass over the cell (B4), the switch of the master module is off and the switch of the slave module is on.

Like this, when the cells are sequentially shifted from the cell (B1) to the cell (B4), it again comes back to the cell (B1). The voltages from the cell (B1) to the cell (B4) are read in such a manner. By repeatedly reading the voltages from the cell (B1) to the cell (B4), it is possible to increase an accuracy of the cell balancing.

Each cell voltage from the voltage switch 4-4 is fixed at the ground since the hold voltage is being read. Accordingly, the voltage of the master module can be directly read with the CPU, but the voltage of the slave module is connected to the ground potential through a calculation amplifier 2-10 since it is required to shift the voltage of the slave module into the ground voltage.

When it is converted to the balance mode from the reading balance mode, the current switch 4-5 is on. Also in the balance mode, the voltage is repeatedly measured in sequence from the cell (B1) to the cell (B4).

When it is desired to enable the current to flow to one of the cells, the CPU 2-1 outputs an on/off control signal to make the balance current on.

Although the on/off of the balance current is described with the function of the auxiliary switch 2-3, it can be also performed with the DC-DC converter 2-2 or current switches 4-5, 6-5.

The current switch cannot be directly connected since the ground potentials of the master module and the slave module are different. Accordingly, the auxiliary switch 2-3 is used.

The auxiliary switch 2-3 turns on the switch of the master module in case that it addresses the cells (from B1 to B4) by the control signal of the controller 4-3, and turns on the switch of the slave module in case that it addresses the cells (from B5 to B8).

In conclusion, the reading hold pulse (RH) and the reading balance pulse (RB) are transmitted from the master module to the slave module through the vertical interface 4-1. Thereby, it is possible to read the voltages of the cells (B1~B8) with a same timing and thus to prevent the voltage reading error due to the timing difference.

While the invention has been shown and described with reference to certain preferred embodiments thereof, it will be understood by those skilled in the art that various changes in form and details may be made therein without departing from the spirit and scope of the invention as defined by the appended claims.

The invention claimed is:

1. A system for adjusting a battery balancing, having a system controller and configured to adjust a voltage balancing of cells in a lithium ion multicell battery pack, the system comprising:
    a multicell battery pack including a master module and a slave module;
    a CPU located in the system controller and configured to output a synchronization signal for each of cells in the master module and the slave module,
    a first vertical interface configured to transmit the synchronization signal outputted from the CPU to the master module; and
    a second vertical interface configured to transmit the synchronization signal transmitted through the first vertical interface to the slave module,
    wherein the synchronization signal comprises a reading hold signal for holding instantaneous voltages of the cells in the multicell battery pack and a reading balance signal for performing reading and balancing of all cell voltages.

2. The system according to claim 1, wherein the synchronization signal comprises:
    a signal for synchronizing the cells of the master module; and
    a signal for synchronizing the master module and the slave module.

3. The system according to claim 1, wherein the synchronization signal comprises a signal for synchronizing an interval of a plurality of multicell battery packs.

4. The system according to claim 1, wherein the vertical interface comprises a photo coupler for transmitting the synchronization signal in parallel.

5. A battery balancing system, comprising:
    a plurality of multicell battery packs comprising a first CPU configured to read terminal voltages of cells in a master module and a slave module based on a synchronization signal comprising a reading hold signal for holding instantaneous voltages of the cells multicell battery pack and a reading balance signal for performing reading and balancing of all cell voltages:
    a system controller configured to collect and calculate cell related data from the multicell battery packs;
    a second CPU installed in the system controller and configured to output the synchronization signal and receive data of all cells in the multicell battery packs to provide a balancing target value required for each of the battery packs; and
    a DC-DC converter configured to control a direction of current flowing to each cell, based on the target value, to adjust a voltage balance.

6. The system according to claim 5, wherein the second CPU is configured to compare the balancing target value and a voltage of each cell and control a current direction of the DC-DC converter so that a balancing current flows to a charge direction in a cell when the voltage of the cell is lower than the balancing target value.

7. The system according to claim 5, wherein the second CPU is configured to compare the balancing target value and a voltage of each cell and control a current direction of the DC-DC converter so that a current flows to a discharge direction in a cell when the voltage of the cell is higher than the balancing target value.

8. The system according to claim 5, wherein the data comprises a maximum voltage, a minimum voltage and a mean value thereof.

9. The system according to claim 5, further comprising:
    a vertical interface configured to transmit the synchronization signal between the multicell battery packs.

10. A method for adjusting a voltage balancing of cells in a lithium ion multicell battery pack, the method comprising steps of:
    outputting a synchronization signal for a cell of a master module in the multicell battery pack module to the master module through a first vertical interface; and
    transmitting the synchronization signal transmitted through the first vertical interface to a slave module in the multicell battery pack through a second vertical interface,
    wherein the synchronization signal comprises a reading hold signal for holding instantaneous voltages of the cells in the multicell battery pack and a reading balance signal for performing reading and balancing of all cell voltages.

11. The method according to claim 10, wherein the synchronization signal comprises:
    a signal for synchronizing cells of the master module; and
    a signal for synchronizing the master module and the slave module.

12. The method according to claim 10, wherein the synchronization signal comprises a signal for synchronizing a plurality of multicell battery packs.

13. The method according to claim 10, wherein the step of transmitting the synchronization signal transmitted through the first vertical interface comprises:
    transmitting the synchronization signal through a photo coupler in parallel.

14. A battery balancing method comprising the steps of:
    outputting a synchronization signal comprising a reading hold signal for holding the cells in the multicell battery pack and a reading balance signal for performing reading and balancing of all cell voltages:
    reading terminal voltages of cells in a master slave and a slave module based on the synchronization signal;
    collecting and calculating data relating to the cells, based on the read terminal voltages;
    receiving data of all the cells in the multicell battery packs to provide a balancing target value required for each of the battery packs; and
    controlling a direction of current flowing to each of the cells to perform a voltage balancing, based on the target value.

15. The method according to claim 14, further comprising a step of:

comparing the balancing target value and a voltage of each cell, wherein the step of performing the voltage balancing comprises a step of controlling a current direction so that a balancing current flows to a charge direction in a cell when the voltage of the cell is lower than the balancing target value.

16. The method according to claim 14, further comprising a step of:

comparing the balancing target value and a voltage of each cell, wherein the step of performing the voltage balancing comprises a step of controlling a current direction so that a balancing current flows to a discharge direction in a cell when the voltage of the cell is higher than the balancing target value.

17. The method according to claim 14, wherein the data comprises a maximum voltage, a minimum voltage and a mean value thereof.

18. The method according to claim 14, further comprising:

a step of transmitting the synchronization signal between the multicell battery packs.

* * * * *